No. 819,314. PATENTED MAY 1, 1906.
A. H. RENSHAW.
CAR COUPLING.
APPLICATION FILED SEPT. 3, 1904.
3 SHEETS—SHEET 3.
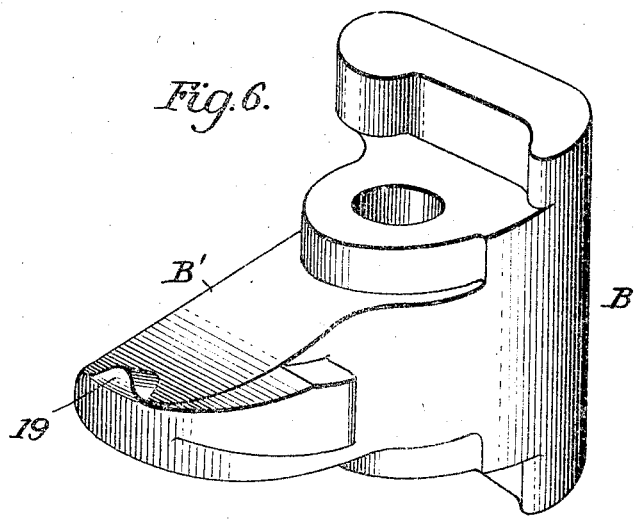
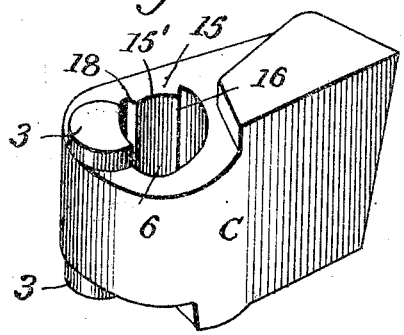
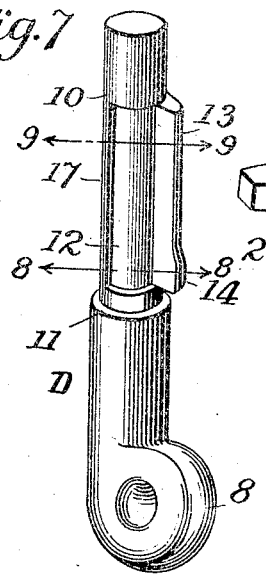
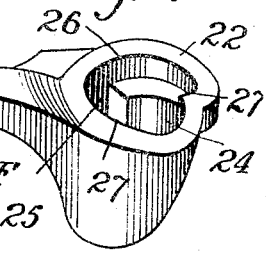
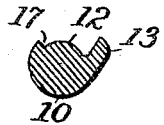
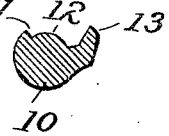
Witnesses
Inventor
Alfred H. Renshaw
Attorneys

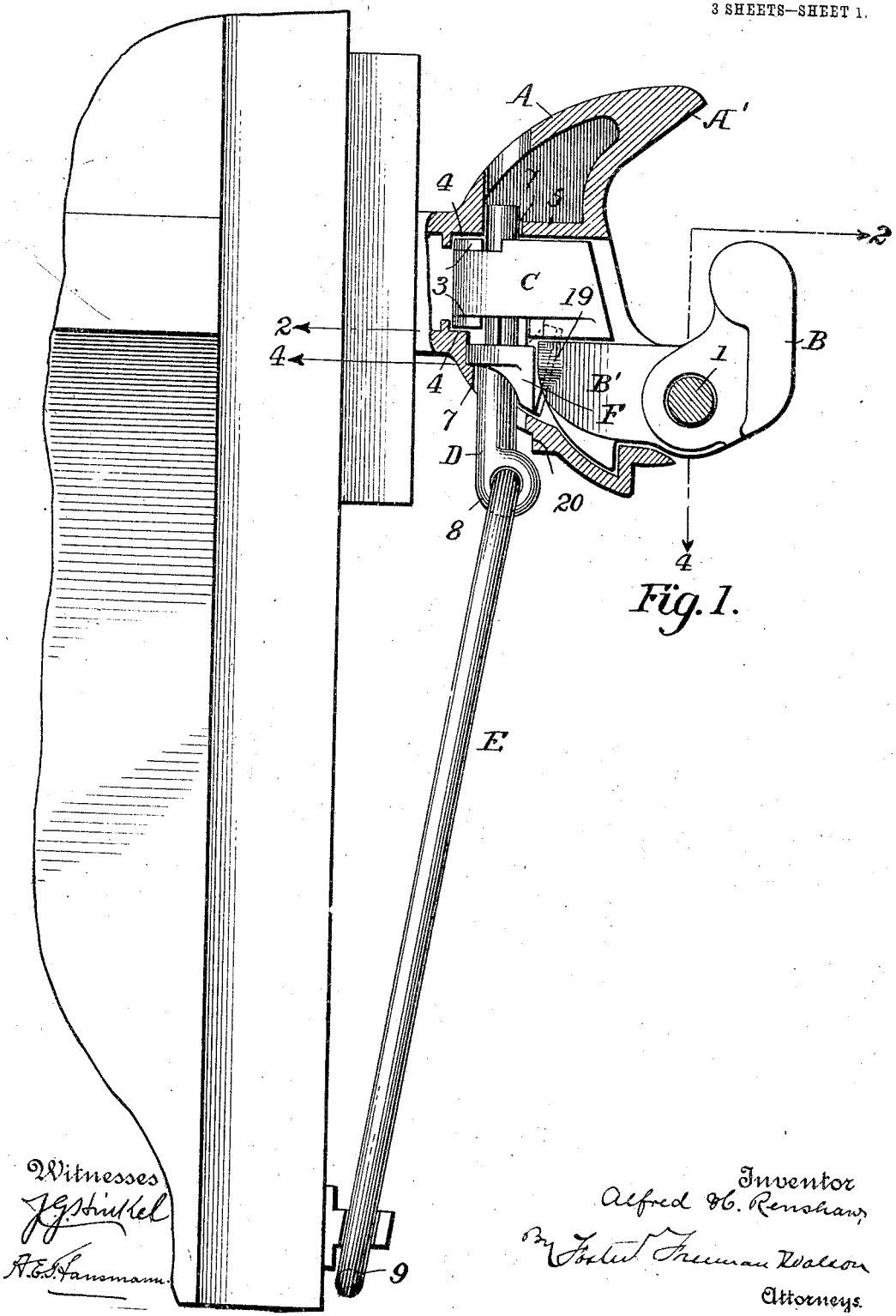

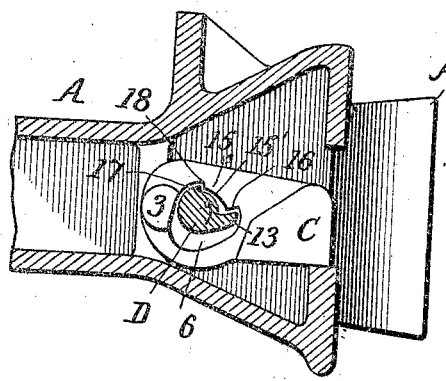
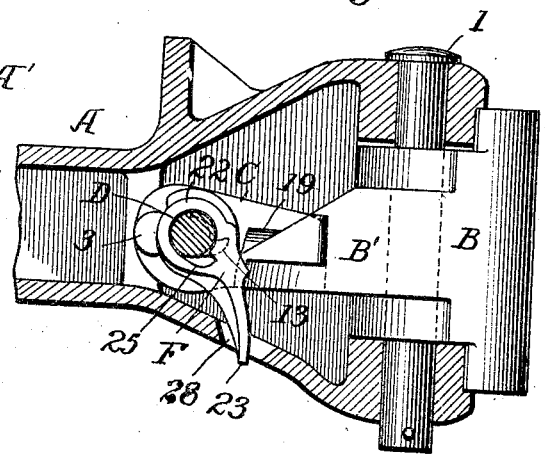
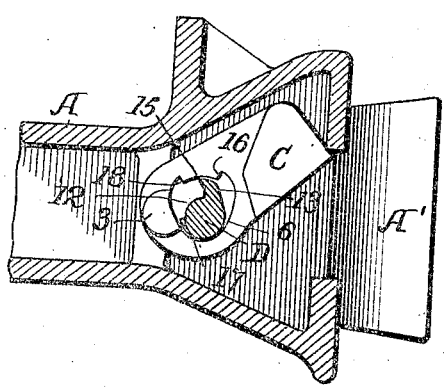
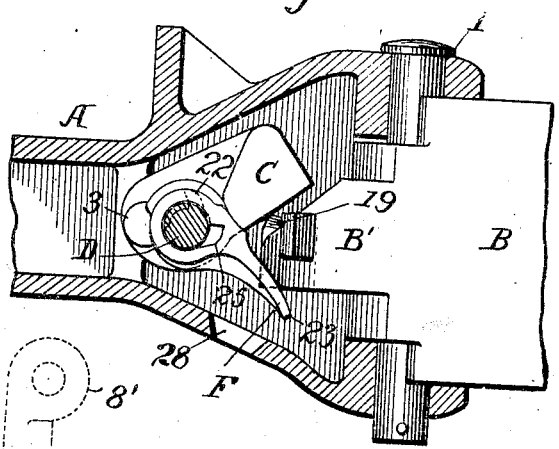
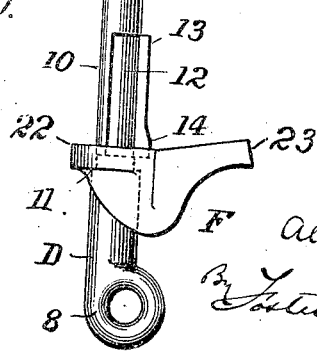

UNITED STATES PATENT OFFICE.

ALFRED H. RENSHAW, OF DARIEN, CONNECTICUT.

CAR-COUPLING.

No. 819,314.

Specification of Letters Patent.

Patented May 1, 1906.

Application filed September 3, 1904. Serial No. 223,170.

*To all whom it may concern:*

Be it known that I, ALFRED H. RENSHAW, a citizen of the United States, residing at Darien, in the county of Fairfield and State of Connecticut, have invented certain new and useful Improvements in Car-Couplings, of which the following is a specification.

This invention relates to certain new and useful improvements in car-couplers of the class known as the "knuckle" or Master Car-Builders' type; and the objects of the invention are to provide a coupler which shall be simple in construction and operation, thoroughly efficient and serviceable in use, and practically automatic in action.

To these ends the invention consists in a coupler having the features of construction, the arrangement of parts, and the mode of operation substantially as hereinafter set forth.

In the accompanying drawings, Figure 1 is a sectional plan view of a car-coupler embodying my improvements with the parts shown in their normal locked position, the outline of a portion of a car-body being also shown. Fig. 2 is a vertical longitudinal section on the line 2 2, Fig. 1. Fig. 3 is a like section showing the lock-block elevated. Fig. 4 is a vertical longitudinal section on the line 4 4, Fig. 1, with the parts in normal position. Fig. 5 is a like section showing the position of the parts with the knuckle open. Fig. 6 is an enlarged perspective view of the knuckle. Fig. 7 is an enlarged perspective view of the operating-rod. Figs. 8 and 9 are cross-sections of the operating-rod, taken, respectively, on the lines 8 8 and 9 9, Fig. 7. Fig. 10 is a plan view of the operating-rod with the knuckle-opening finger thereon. Fig. 11 is an enlarged perspective view of the knuckle-opening finger, and Fig. 12 is an enlarged perspective view of the lock-block.

In carrying out my invention one object has been to maintain the general form of the well-known "Trojan" coupler, wherein the coupler is operated from the side instead of the top, thus effectually excluding sand, gravel, coal, and other substances which are apt to enter and clog couplers of other forms. Other objects have been to reduce the leverage usually required to unlock couplers of this general character, to avoid the necessity of the trainmen going between the cars to adjust the knuckle preparatory to making a coupling, to provide improved means for effecting an "automatic lock set" and its release without going between the cars, and to dispense with the use of a special bracket on the car to hold the side hand-rod permanently in a position to maintain the lock-block in its unlocked position when so desired and release it without going between the cars.

I will now proceed to describe the preferred embodiment of my invention as shown in the drawings, although it will be understood that the details of construction may be varied within certain limits without departing from the spirit and scope of the invention.

A designates the draw-head, which is porvided with the usual guard-arm A' and may in general be of any suitable configuration. Pivotally mounted in the draw-head on the pivot-pin 1 is the knuckle B, having the locking-arm B', which normally extends into the head, and this knuckle may be provided with suitable offset portions to limit its movements in the head or be otherwise shaped, as occasion may require.

C is the lock-block, which may be pivoted in the draw-head in any convenient manner so as to swing in a vertical plane into and out of locking engagement with the arm B' of the knuckle when the latter is closed; but, as preferred, the lock-block is provided with laterally-extending trunnions 3, adapted to bearing-sockets 4 in the head. This lock-block is suitably shaped and when in locking position rests on the bottom of the draw-head and fills the space between the locking-arm of the knuckle and the vertical web 5 of the head, Fig. 1. When the lock-block is elevated above the path of movement of the locking-arm, the knuckle is free to swing to its open position, and when the knuckle is fully open the lock-block normally rests upon the locking-arm, Fig. 5, in readiness to fall into locking position in front of the arm when the knuckle is again closed.

D is an operating-rod extending transversely through an opening 6 in the lock-block eccentric to the pivot of the latter and free to turn in suitable bearings 7 7 in the draw-head. This operating-rod preferably terminates at its outer end in an eye 8, to which is loosely connected a hand-rod E, extending to the side of the car and provided with a handle 9 at a right angle to the body of the rod and normally occupying a vertical position. If desired, an eye 8' (shown in dotted lines in Fig. 10) may be pinned to the other end of the operating-rod, so that the rod can be operated from either side of the car.

As shown, the body portion of the operating-rod D is generally circular in cross-section and is reduced somewhat in diameter for a portion of its length, as at 10, forming an annular shoulder 11. The portion 10 is provided with a recess 12, at one side of which is a projection or rib 13, which, as best illustrated in Fig. 7, increases in depth at its outer end, as at 14, for a purpose which will hereinafter appear. The recess 12 is adapted to receive a projection or rib 15, extending inward from the upper side of the opening 6 in the lock-block when the latter is in locking position, Fig. 2. On turning the operating-rod D in the direction of the arrow, Fig. 2, the rib 13 engages the side 16 of the rib 15 with a cam-like action, thereby raising the lock-block to its unlocking position, Fig. 3, whereupon the rib 13 passes beneath the rib 15 and engages the inner face 15′ and holds the lock-block elevated. The weight of the lock-block resting on the rib 13 maintains the parts in this position, the face 15′ being concaved or notched to afford a firm bearing for the edge of the rib 13. The operation of thus lifting and holding the lock-block elevated constitutes the so-called "automatic lock set." If now the knuckle is moved to its open position, a boss 19 on the locking-arm B′ thereof engages the under side of and lifts the lock-block out of engagement with the rib 13, Fig. 5, and thereby releases the rod D and the connected operating-handle 9, which latter thereupon descends under the action of gravity from its horizontal to its normal vertical position, returning the rod D to the position shown in Fig. 2. With the lock-block resting on the locking-arm of the knuckle, as stated, the parts are in position for automatic coupling, as will be understood.

In addition to the automatic lock set before described it is sometimes desirable to secure the lock-block C permanently in its elevated position, Fig. 5, so that the knuckle may be free to swing on its pivot. This so-called "permanent lock set" is effected by first raising the lock-block in the manner explained and then pushing inward the operating-rod D by means of the hand-rod E until the eye 8 or other projection on the rod D engages a vertical locking-shoulder 20 on the draw-head, Fig. 1. In this position the operating-rod is securely locked against backward rotation and must be first drawn outward with the hand-rod E until the eye again clears the shoulder before the parts can return to normal position. It will be seen that by this construction the employment of a special bracket on the car for holding the hand-rod permanently in position to maintain the coupler unlocked is dispensed with.

It frequently happens that the wrong coupler is unlocked by mistake or otherwise, and it is therefore important that suitable means be provided whereby after the lock-block has been raised and set for uncoupling by the automatic lock set it may be again returned to locking position without first opening the knuckle to effect its release. This is accomplished in the present instance by pushing the operating-rod D axially inward until the extended portion 14 of the rib 13 engages the adjacent end of the rib 15 of the lock-block, raising the latter slightly above the main portion of the rib 13, whereupon the said rod may be readily turned back to its normal position and the lock-block lowered.

When the knuckle is unlocked, it may be moved to its open position ready for coupling by a knuckle-opening finger F, mounted on the rod D and adapted to be operated thereby. This finger consists of a hub 22 and a substantially radial finger portion 23, the hub having an opening 24 to receive the rod, a slot 25, Fig. 5, permitting the passage of the rib 13 in assembling the parts. When in normal position on the rod, Figs. 4 and 10, the hub is confined between the shoulder 11 and the outer end of the rib 13, which enters an arc-shaped recess 26 in the inner side of the hub and wherein the rib is free to play between the end walls 27 27, Fig. 11.

Upon turning the hand-rod E to unlock the coupler the lock-block will first be raised above the locking-arm B′, Fig. 5, as before explained, when the continued rotation of the rod will bring the rib 13 into engagement with one of the walls 27 of the recess 26 of the finger, Fig. 11, whereupon the finger portion 23 will be forced against the outer inclined face of the locking-arm of the knuckle, Fig. 5, causing the latter to swing open, the finger pushing the locking-arm until the knuckle is fully open. In the latter position, the lock-block being supported by the boss 19 of the locking-arm B′, the operating-rod is free to return to its normal position under the influence of the weight of the handle 9. When the knuckle again closes, as in coupling, the lock-block will fall into locking position, as before.

In the position of the parts shown in Fig. 2 the shoulder 17 on the rod D engages the shoulder 18 on the locking-block. By this construction the rotation of the rod in turning back from the position shown in Fig. 3 is arrested and the rod held against further turning in this direction. Moreover, it will be noticed that when the finger F is in its normal position, Fig. 4, the slot 25 is out of line with the rib 13 of the operating-rod, so that the rod cannot be withdrawn from the draw-head. To permit its withdrawal, the finger must first be lifted to bring the slot 25 into line with the rib 13, when the rod may be readily drawn out and the coupler dismembered. When in its lowermost position, the free end of the finger preferably extends into an opening 28 in the lower wall of the draw-head.

It will be apparent that in a coupler constructed substantially as herein set forth the knuckle may be unlocked and adjusted to its various positions for coupling and uncoupling by means of the hand-rod, thereby making it unnecessary for the trainmen to go between the cars for this purpose. It will further be seen that little power is required to effect these various operations and that the coupler is composed of few parts, which are not liable to break or get out of order.

Without limiting myself to the precise construction and arrangement of parts set forth, I claim—

1. The combination of a draw-head, a knuckle, a pivoted lock-block, an operating-rod engaging the lock-block eccentric to its pivot and adapted to lift and hold the lock-block elevated, and a hand-rod whereby to both lift and release the lock-block from the side of the car, substantially as set forth.

2. The combination of a draw-head, a knuckle, a pivoted lock-block, and an operating-rod extending through the lock-block eccentric to the pivot of the latter, and adapted to swing the lock-block on its pivot when the rod is turned, substantially as set forth.

3. The combination of a draw-head, a pivoted knuckle, a pivoted lock-block, and an operating-rod extending transversely through the lock-block eccentric to the pivot of the latter, and adapted to lift the lock-block and hold it in its elevated position when the rod is turned, substantially as set forth.

4. The combination of a draw-head, a pivoted knuckle, a pivoted lock-block having a transverse opening eccentric to its pivot and a projection extending into said opening, and an operating-rod extending through said opening and provided with a projection adapted to engage the projection on the block and lift the block when the rod is turned, substantially as set forth.

5. The combination of a draw-head, a pivoted knuckle, a pivoted lock-block having a transverse opening, and a projection extending into the opening and provided with an inner bearing-face, and an operating-rod having a projection adapted to first engage the side of the projection on the block to lift the latter and to then engage said inner face of the projection to hold the block elevated, substantially as set forth.

6. The combination of a draw-head, a pivoted knuckle, a pivoted lock-block, an operating-rod extending through the lock-block eccentric to the pivot of the latter, means on said rod for lifting the lock-block and holding it in elevated position, and means on the knuckle for releasing the lock-block, substantially as set forth.

7. The combination of a draw-head, a pivoted knuckle having a locking-arm, a pivoted lock-block, an operating-rod extending through the lock-block eccentric to the pivot of the latter, means on said rod for lifting the lock-block and holding it in elevated position, and a boss on the locking-arm of the knuckle for releasing the lock-block, substantially as set forth.

8. The combination of a draw-head, a pivoted knuckle, a pivoted lock-block having a transverse opening eccentric to its pivot, an operating-rod extending through said opening and having a rib adapted to lift the block and hold it elevated, and a boss on the locking-arm of the knuckle adapted to release the lock-block, substantially as set forth.

9. The combination of a draw-head, a knuckle, a pivoted lock-block, an operating-rod eccentric to the pivot of the lock-block adapted to lift the latter and hold it elevated, means on the knuckle for raising the lock-block out of engagement with the rod, and means for automatically returning the rod to its normal position, substantially as set forth.

10. The combination of a draw-head, a knuckle, a pivoted lock-block, an operating-rod eccentric to the pivot of the lock-block adapted to lift the latter and hold it elevated, means on the knuckle for raising the lock-block out of engagement with the rod, and a hand-rod having a handle adapted to automatically return the operating-rod to its normal position, substantially as set forth.

11. The combination of a draw-head, a knuckle, a lock-block, an operating-rod having a rib adapted to lift the lock-block and hold it elevated, a boss on the locking-arm of the knuckle, a hand-rod connected to the operating-rod and having a handle extending from one side only and normally occupying a vertical position, substantially as set forth.

12. The combination of a draw-head, a pivoted knuckle, a pivoted lock-block, an operating-rod adapted to lift the lock-block, a knuckle-opening finger loose on said rod, and connections between the rod and finger whereby the finger is operated to open the knuckle after the lock-block is lifted, substantially as set forth.

13. The combination of a draw-head, a pivoted knuckle, a pivoted lock-block having a transverse opening, an operating-rod extending through the lock-block and having a rib, and a knuckle-opening finger loosely mounted on the rod and adapted to be engaged and operated by said rib, substantially as set forth.

14. The combination of a draw-head, a pivoted knuckle, a pivoted lock-block, an operating-rod for the block, a rotatable knuckle-opening finger carried by the rod, and means on the rod and finger whereby the finger is rotated only after the rod has lifted the lock-block, substantially as set forth.

15. The combination of a draw-head, a knuckle, a lock-block, a rotating and sliding operating-rod therefor having an eye; a hand-rod secured to the eye, and a vertical locking-shoulder on the draw-head adapted to be engaged by said eye, substantially as set forth.

16. An operating-rod for a lock-block, consisting of a body substantially circular in cross-section and reduced in diameter for a portion of its length and having a recess in its reduced portion adapted to receive a rib on the lock-block, and a projection or rib at one side of said recess, substantially as set forth.

17. An operating-rod for a lock-block, consisting of a body substantially circular in cross-section and reduced in diameter for a portion of its length and having a recess in its reduced portion adapted to receive a rib on the lock-block, a projection or rib at one side of said recess, and an eye at one end of the rod, substantially as set forth.

18. An operating-rod for a lock-block, consisting of a body substantially circular in cross-section and reduced in diameter for a portion of its length forming an annular shoulder and having a recess in said reduced portion adapted to receive a projection or rib on the lock-block, and a projection or rib at one side of said recess, said rib increasing in depth at the end adjacent to said shoulder, substantially as set forth.

19. A lock-block adapted to be pivoted at its inner end and having an opening transversely therethrough eccentric to the pivot-point, substantially as set forth.

20. A lock-block adapted to be pivoted at its inner end and having an opening transversely therethrough in advance of the pivot-point, and a projection or rib extending inward from the upper portion of said opening, substantially as set forth.

21. A lock-block provided with trunnions at its inner end and having an opening transversely through its body for the reception of an operating-rod, substantially as set forth.

22. A lock-block provided with trunnions at its inner end and having an opening transversely through its body for the reception of an operating-rod, and a projection or rib extending inward from the upper portion of said opening, substantially as set forth.

23. A pivotal lock-block having an opening transversely through its body and a projection or rib extending inward from the upper side of the opening and having a concave face, substantially as set forth.

24. A knuckle-opening finger consisting of a hub and a substantially radial finger portion, the hub having a central opening, and a slot in the wall of said opening, substantially as set forth.

25. A knuckle-opening finger consisting of a hub and a substantially radial finger portion, the hub having a recess in one of its side faces and a central opening with a slot in its wall, substantially as set forth.

In testimony whereof I have signed my name to this specification in the presence of two subscribing witnesses.

ALFRED H. RENSHAW.

Witnesses:
 B. L. SHAFER,
 M. J. CUNNINGHAM.